UNITED STATES PATENT OFFICE.

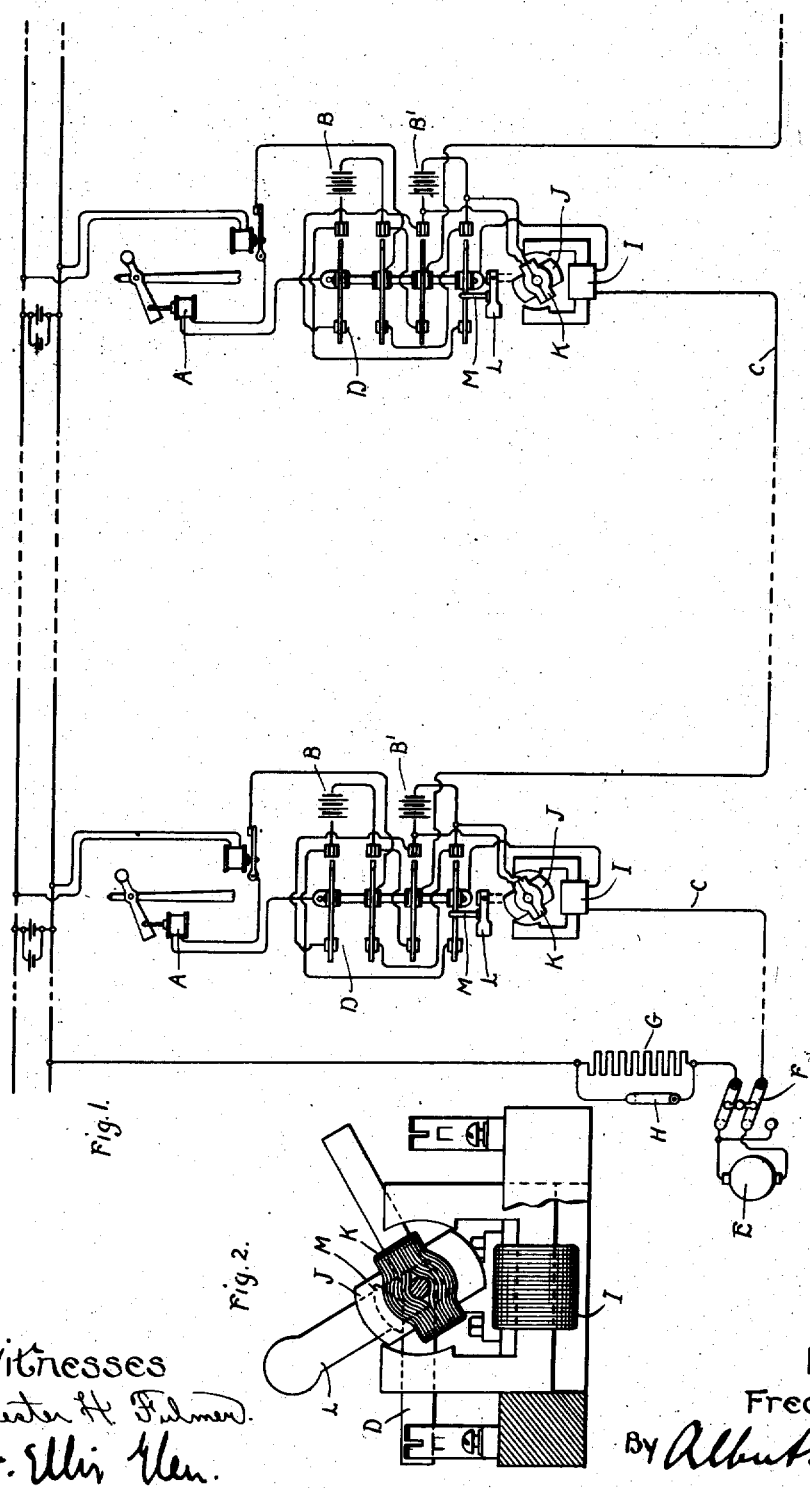

FRED B. COREY, OF SCHENECTADY, NEW YORK, ASSIGNOR TO GENERAL ELECTRIC COMPANY, A CORPORATION OF NEW YORK.

CHARGING SYSTEM FOR STORAGE BATTERIES.

No. 896,973.                Specification of Letters Patent.            Patented Aug. 25, 1908.

Application filed March 21, 1907. Serial No. 363,780.

*To all whom it may concern:*

Be it known that I, FRED B. COREY, a citizen of the United States, residing at Schenectady, county of Schenectady, State of New York, have invented certain new and useful Improvements in Charging Systems for Storage Batteries, of which the following is a specification.

My invention relates to charging systems for storage batteries, and is particularly applicable to storage batteries supplying railway signal mechanisms.

When railway signals are supplied from storage batteries, it is ordinarily desirable to employ two batteries at each signal so that one battery may supply the signal mechanism while the other battery is being charged. Furthermore, it is desirable to employ automatic means for connecting the batteries to the signals alternately, so that by a change in circuit connections at the generating station the relative connections of the batteries at each signal may be controlled. One arrangement that has been suggested heretofore for this purpose employs two charging conductors, to which the two batteries at each signal or battery station are respectively connected, with automatic means whereby, when either conductor is being supplied with charging current, the battery not connected to that conductor is connected to the signal mechanism.

By my invention I dispense with one charging conductor by providing a switch arranged to connect the batteries alternately to the same conductor and to the signal mechanism, with means controllable from a distance for operating the switch. In order to avoid the use of a control wire for the switch-operating mechanism, my invention further comprises inserting the operating means for the switches in the charging conductor, and arranging it so that it responds to a reversal of flow of charging current in that conductor.

My invention will best be understood by reference to the accompanying drawings, in which Figure 1 shows diagrammatically a charging system for storage batteries arranged in accordance with my invention; and Fig. 2 shows a view of one of the automatic switches.

In the drawings A A represent diagrammatically the operating mechanisms for a series of railway signals. At each signal are placed two storage batteries B B'.

C represents a charging conductor which extends through the several signal stations for supplying charging current to the batteries.

D represents a switch arranged to connect the batteries B B' at each station alternately to the charging conductor and to the signal operating mechanism A.

E represents a source of current at the generating station for charging the batteries.

F represents a reversing switch for connecting either terminal of the generator E to the charging conductor C. One of the track-rails is shown as continuous to form a return for the charging circuit, but if preferred, the charging circuit may be completed by any other conductor.

G represents a resistance in series with the generator and charging conductor, provided with a short-circuiting switch H.

In order to actuate the switches D a magnet winding I is inserted in the charging conductor at each station. This winding acts as a field winding for a rotatable armature J carrying a winding K, which is connected directly across the terminals of one of the batteries, and consequently acts to polarize the armature J. The direction of the torque exerted on this armature by the winding I depends upon the direction of current-flow through the winding I. The armature J carries a weight L, which tends to rotate the armature in either direction from a central position. This weight carries a projection M, which engages the switch D, so that the weight L tends to press the switch D into one or the other of its operative positions. With the switch D in the position shown, battery B is connected in series with the charging conductor C, while battery B' is connected to the signal mechanism A. If it is desired to charge battery B', switch H at the generating station is first opened, and switch F is then thrown to its other position. This connects the other terminal of the generator E to the charging conductor C and reverses the flow of current in this conductor. Consequently, the torque exerted by the winding I on the armature J is reversed; thereby rotating the armature in a clockwise direction.

As will be seen from Fig. 2, the switch D is not affected by the first part of the movement of the armature J, but after switch L has passed its central position, the projection M is brought into engagement with the right-hand side of switch D; thereby rocking switch D so as to open the left-hand blades and close the right-hand blades. This connects battery B' to the charging conductor and battery B to the signal mechanism A. It will be seen that switch D does not open until after the weight L, carried by armature J has passed its central position. The projection M then strikes the switch with a hammer-blow and shifts switch D with a snap action. This snap action, which is secured by the lost-motion connection between switch D and magnet winding I, is necessary to complete the movement of the switch D, since the circuit of winding I is interrupted as soon as the left-hand blades of switch D leave their contact clips, and consequently the momentum of weight L is relied upon for completing the movement of switch D.

It will be seen that if resistance G were not cut into circuit before switch F was shifted to its other position, a short-circuit would be produced, since as soon as switch F was thrown, generator E and all the storage batteries connected to the conductor would be connected in a closed circuit with their electromotive forces all in the same direction. Consequently, switch H should be opened before switch F is shifted. After switch F has been shifted, however, and the switches D reversed, switch H may again be closed. Obviously, switches H and F may be combined in a single structure if desired.

I do not desire to limit myself to the particular construction and arrangement of parts here shown, but aim in the appended claims to cover all modifications which are within the scope of my invention.

What I claim as new, and desire to secure by Letters Patent of the United States, is,—

1. In a charging system for storage batteries, a plurality of stations, a pair of batteries and a translating device at each station, a charging conductor extending through said stations, a switch at each station adapted to connect the batteries alternately to said conductor and to said device, and operating means for the switch at each station responsive to a reversal of current in said conductor.

2. In a charging system for storage batteries, a plurality of stations, a pair of batteries and a translating device at each station, a charging conductor extending through said stations, a switch at each station adapted to connect the batteries alternately to said conductor and to said device, operating means for the switch at each station responsive to a reversal of current in said conductor, and a lost-motion connection between said operating means and said switch.

3. In a charging system for storage batteries, a plurality of stations, a pair of batteries and a translating device at each station, a charging conductor extending through said stations, a switch at each station adapted to connect the batteries alternately to said conductor and to said device, operating means for the switch at each station responsive to a reversal of current in said conductor, a lost-motion connection between the movable winding and said switch, and means for reversing the direction of flow of current in said conductor.

4. In a charging system for storage batteries, a plurality of stations, a pair of batteries and a translating device at each station, a charging conductor extending through said stations, a switch at each station adapted to connect the batteries alternately to said conductor and to said device, and operating means responsive to a reversal of current in said conductor adapted to shift the switch at each station with a snap-action to either of its operative positions.

5. In a charging system for storage batteries, a plurality of stations, a pair of batteries and a translating device at each station, a charging conductor extending through said stations, a switch at each station adapted to connect the batteries alternately to said conductor and to said device, and operating means for the switch at each station comprising two coöperating windings, one in circuit with said conductor and the other supplied with current from one of the batteries.

6. In a charging system for storage batteries, a plurality of stations, a pair of batteries and a translating device at each station, a charging conductor extending through said stations, a switch at each station adapted to connect the batteries alternately to said conductor and to said device, operating means for the switch at each station comprising two relatively movable windings, one in circuit with said conductor and the other supplied with current from one of the batteries, and a lost-motion connection between the movable winding and said switch.

7. In a charging system for storage batteries, a plurality of stations, a pair of batteries and a translating device at each station, a charging conductor extending through said stations, a switch at each station adapted to connect the batteries alternately to said conductor and to said device, operating means for the switch at each station comprising two coöperating windings, one in circuit with said conductor and the other supplied with current from one of the batteries, and means for reversing the direction of flow of charging current in said conductor.

8. In a charging system for storage batteries, a plurality of stations, a pair of batteries and a translating device at each station, a charging conductor extending through said stations, a switch at each station adapted to connect the batteries alternately to said conductor and to said device, operating means for the switch at each station responsive to a reversal of current in said conductor, and means for reversing the direction of flow of charging current in said conductor.

9. In a charging system for storage batteries, a plurality of stations, a pair of batteries and a translating device at each station, a charging conductor extending through said stations, a switch at each station adapted to connect the batteries alternately to said conductor and to said device, operating means responsive to a reversal of current in said conductor adapted to shift the switch at each station with a snap-action to either of its operative positions, and means for reversing the direction of flow of charging current in said conductor.

In witness whereof, I have hereunto set my hand this 19th day of March, 1907.

FRED B. COREY.

Witnesses:
BENJAMIN B. HULL,
HELEN ORFORD.